United States Patent [19]

Yoshikura et al.

[11] Patent Number: 5,257,181
[45] Date of Patent: Oct. 26, 1993

[54] PROGRAMMABLE CONTROL SYSTEM

[75] Inventors: Fuyuhiko Yoshikura, Nagoya; Teiji Uno, Kariya, both of Japan

[73] Assignee: Toyota Jidosha Kabushiki Kaisha, Aichi, Japan

[21] Appl. No.: 673,513

[22] Filed: Mar. 22, 1991

[30] Foreign Application Priority Data

Mar. 24, 1990 [JP] Japan .................. 2-74522

[51] Int. Cl.$^5$ ............................................. G06F 13/14
[52] U.S. Cl. ................................. 364/140; 364/133; 340/825.07
[58] Field of Search ............... 364/131, 133, 140, 141; 340/825.07

[56] References Cited

U.S. PATENT DOCUMENTS

| | | | |
|---|---|---|---|
| 4,550,366 | 10/1985 | Toyama et al. | 364/136 |
| 4,701,878 | 8/1987 | Gunkel et al. | 364/900 |
| 4,754,427 | 6/1988 | Okayama | 364/132 |
| 4,910,658 | 3/1990 | Dudash et al. | 364/138 |
| 5,072,374 | 12/1991 | Sexton et al. | 395/800 |
| 5,095,417 | 3/1992 | Hagiwara et al. | 364/138 |
| 5,122,948 | 6/1992 | Zapolin | 364/131 |

FOREIGN PATENT DOCUMENTS

| | | |
|---|---|---|
| 0104859A | 4/1984 | European Pat. Off. |
| 0161344A | 12/1984 | European Pat. Off. |
| 0132381A | 1/1985 | European Pat. Off. |
| 0187677A | 7/1986 | European Pat. Off. |
| 42-1835 | 3/1967 | Japan |
| 51-46683 | 4/1976 | Japan |
| 57-79504 | 5/1982 | Japan |
| 2101358A | 1/1983 | United Kingdom |

OTHER PUBLICATIONS

British Search Report, Application No. 9105858.6, date of search Jul. 8, 1991.
"Mechanical Automation 1981", Nov. 1, 1981.

Primary Examiner—Jerry Smith
Assistant Examiner—Paul Gordon
Attorney, Agent, or Firm—Finnegan, Henderson, Farabow, Garrett, Dunner

[57] ABSTRACT

A programmable control comprising a plurality of programmable controllers (PC's) for executing parallel control. Each PC is provided with a link control table for storing the numbers of the PC's to which link data such as interlock information is supplied. In each PC, a link data file in which link data to be required are listed is created. The link data file is circulated to each PC. Each PC creates a link control table in accordance with the contents of the received link data file.

3 Claims, 13 Drawing Sheets

44

| PC SUPPLIER | | |
|---|---|---|
| 21 | | |
| DESIGNATED PC NO. | EQUIPMEMT CODE | RECEPTION |
| 11 | 11F1D2P ⋮ | YES |
| 22 | 22F1D2P ⋮ | |
| 31 | NONE | |
| 32 | NONE | |

| 21 | 11 | EQUIPMEMT CODE | Y or N | 22 | EQUIPMEMT CODE | Y or N | | Y or N |
|---|---|---|---|---|---|---|---|---|

PROGRAMMABLE CONTROL SYSTEM

BACKGROUND OF THE INVENTION

1. Field of the Invention

The present invention relates to a programmable control system including a plurality of programmable controllers (or programmable ladder controllers, hereinunder referred to as "PC's") for automatically controlling various pieces of equipment.

2. Description of the Related Art

PC's are used for controlling various pieces of equipment such as a transfer machine and a PC having more functions and easy to use has recently been demanded for realizing factory automation.

As shown in FIG. 1, a conventional PC 10 includes a memory 12 for storing a sequence program and a control processor 14 for controlling a piece of equipment in accordance with the sequence program. The PC 10 further includes I/O portion (not shown) connected to an external piece of equipment, data memory (not shown), system memory (not shown), etc. FIG. 2 shows what is called a relay ladder for showing the order and the conditions of control with respect to the equipment being controlled. Equipment being controlled includes virtual equipment (dummy equipment) which exists only in a program.

A relay symbol 16 in the relay ladder diagram represents a piece of equipment being controlled. An address 18 shown in the vicinity of the relay symbol 16 is a local I/O address which is only effective in the PC 10. The I/O address is expressed by an octal digit, a hexadecimal digit or the like and individually allotted to each piece of equipment.

The order and the conditions of control shown in the relay ladder diagram are programmed by a programming language such as a logic symbol language and a relay symbol language and stored in the memory 12 as a sequence program. To state this more concretely, in the sequence program, a command and an I/O address to each piece of equipment are entered, as shown in FIG. 1. The sequence program memory 12 therefore includes a region 12a for storing a command and a region 12b for storing an address.

A conventional programmable control system is composed of a plurality of PC's which are connected to each other through a link bus. The PC's control a plurality of pieces of equipment in parallel with each other while transmitting and receiving link data between PC's through the link bus. The link data is information necessary for successively controlling the PC's. It is, for example, interlock information. In a system including a plurality of PC's, interlock information is essential.

Conventionally, the operator judges what kind of link data is necessary between PC's and writes the number of the PC to which the link data is supplied into, for example, a link control table. In the link control table, the numbers of the PC's to which the link data is supplied are stored in correspondence with the respective steps of the sequence program.

It is therefore necessary for the operator to create a link control table for each PC in planning a system. The manual creation of the link control table is very troublesome and is apt to cause an error.

Especially, in the system including a multiplicity of PC's, it takes the operator much time and labor to create a link control table for each PC, which leads to a trouble in planning and correcting a system.

SUMMARY OF THE INVENTION

Accordingly, it is an object of the present invention to solve the above-described problems in the related art and to provide a programmable control system which is capable of automatically creating a link control table without manual processing for controlling link data which is transmitted and received between PC's.

To achieve this object, the present invention provides a programmable control system comprising a link file creating means, a link data file supplying means and a link control table writing means.

According to this structure, when a link data file is circulated, the PC which has received the link data judges what kind of link data is required to supply therefrom. Each PC creates its own link control table in accordance with the contents of the received file.

Therefore, if all the PC's create link data files and circulate the created files to each other, link control tables are completed by all the PC's. The operator is thus released from the trouble of creating a link control table, which takes much time. It is also possible to completely eliminate defects which may be produced by manual creation of a link control table.

Equipment codes for the pieces of equipment which are controlled by the respective PC's are written in the link data file. The equipment code includes, for example, a number code for a PC, a type code for a piece of equipment and a number code for a piece of equipment.

The above and other objects, features and advantages of the present invention will become clear from the following description of a preferred embodiment thereof, taken in conjunction with the accompanying drawings.

BRIEF DESCRIPTION OF THE DRAWINGS

FIG. 7 schematically shows an image of a link data file which is circulated to each PC;

FIG. 8 is an explanatory view of the data structure of a link data file;

DESCRIPTION OF THE PREFERRED EMBODIMENT

An embodiment of the present invention will be explained hereinunder with reference to the accompanying drawings.

Figure 1:
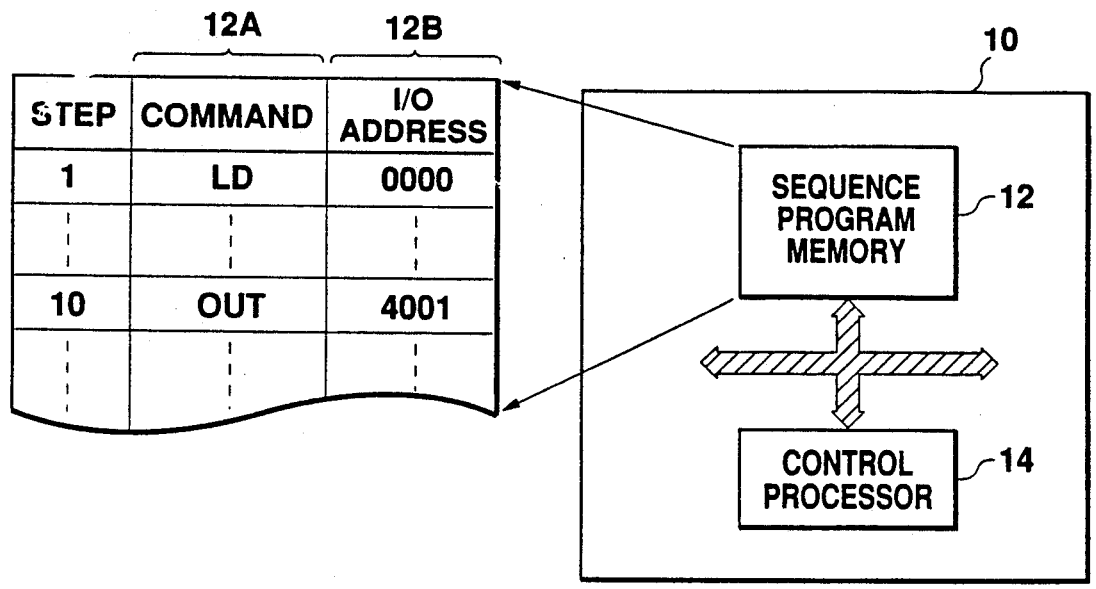
FIG. 1 is an explanatory view of the structure of a conventional PC and an example of a program thereof.
Figure 2:
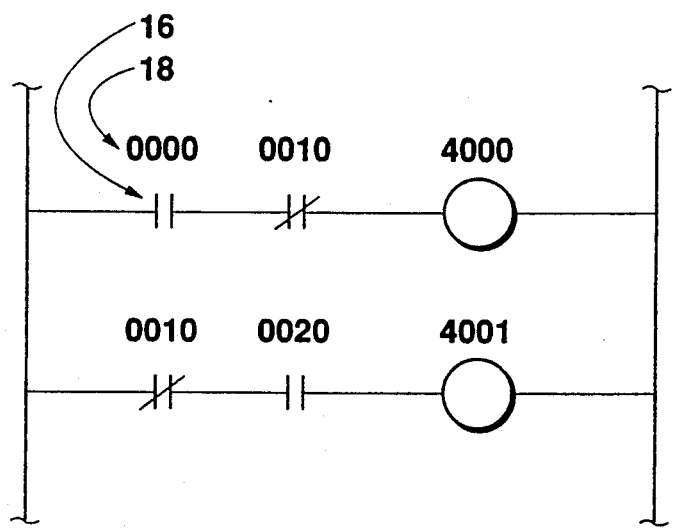
FIG. 2 is an explanatory view of an example of a relay ladder diagram.
Figure 3:
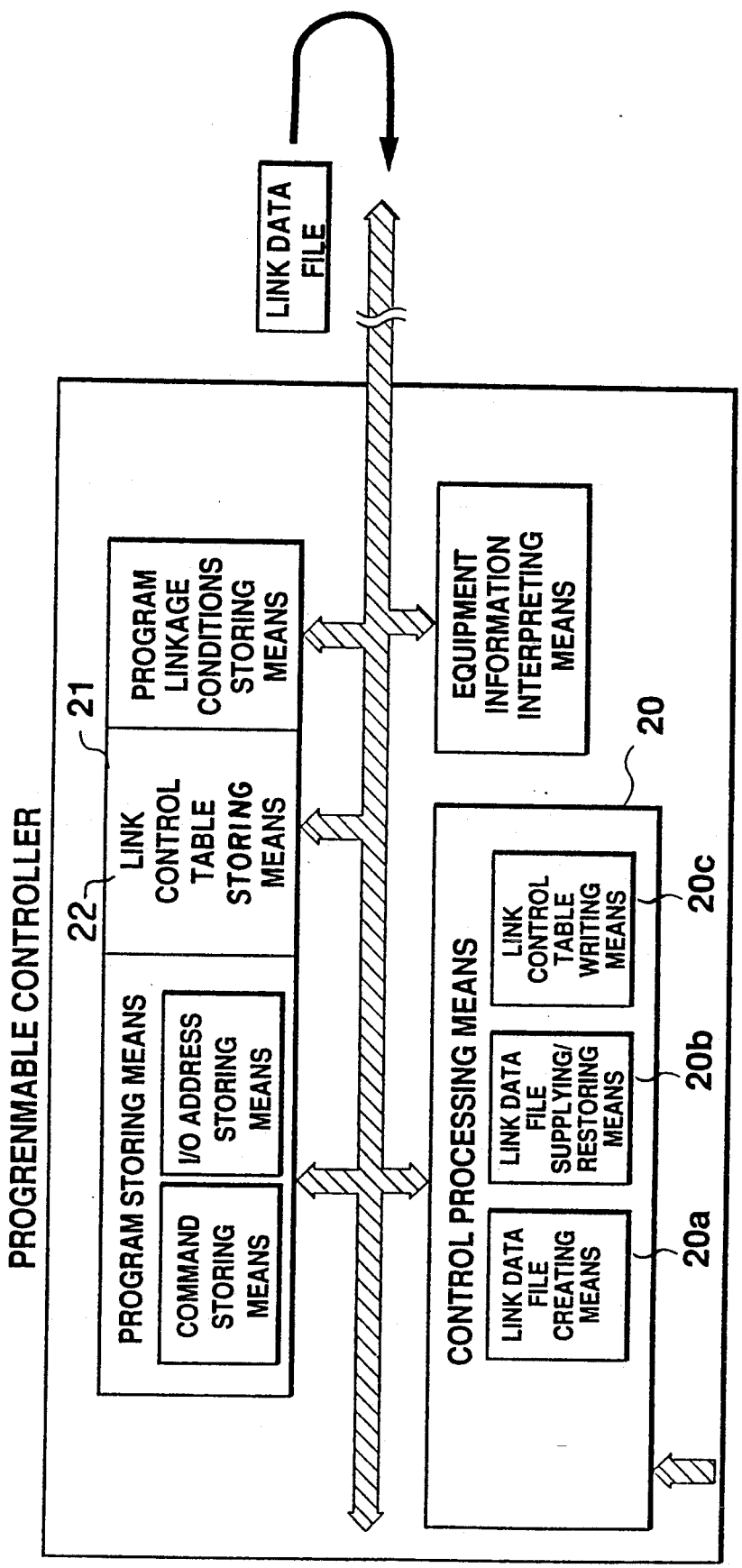
FIG. 3 is a block diagram of the structure of a PC according to the present invention.

FIG. 3 schematically shows the structure of a programmable controller (PC) in a programmable control system according to the present invention. The characteristic structure is mainly composed of a link data file creating means 20a, a link data file supplying/restoring means 20b, and a link control table writing means 20c. These means are included in a control processing means 20. The control processing means 20 corresponds to a later-described control processor 35 (see FIG. 4).

Each of these means will be schematically explained. The link data file creating means 20a creates a link data file and the created link data file is output to external PC's by the link data file supplying/restoring means 20b. A link data file which has been circulated and returned is restored by the link data file supplying/restoring means 20b.

The link data file supplied from another PC is fetched by the control processing means 20, and the link control table writing means 20c creates a link data control table 21, which is to be stored in a link control table storing means 22, in accordance with the contents of the fetched file.

The details of these means will be made clear in the following embodiment.

Figure 4:
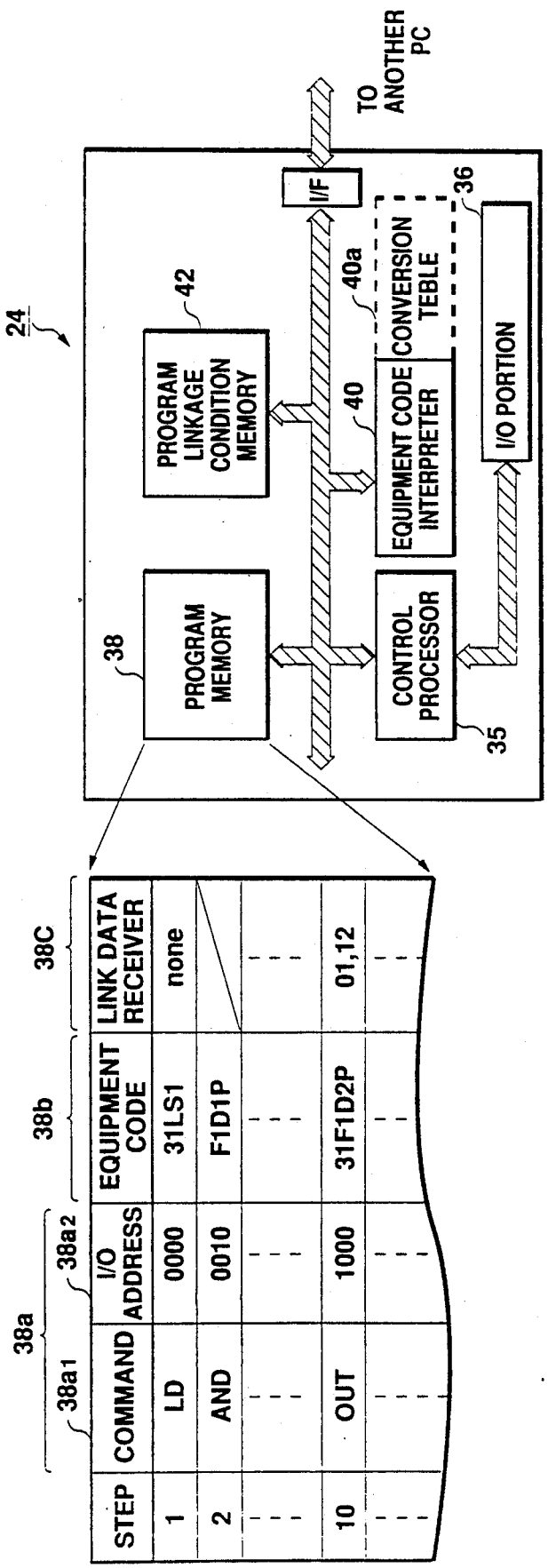
FIG. 4 is a block diagram of the structure of an embodiment of a PC according to the present invention.
Figure 5:
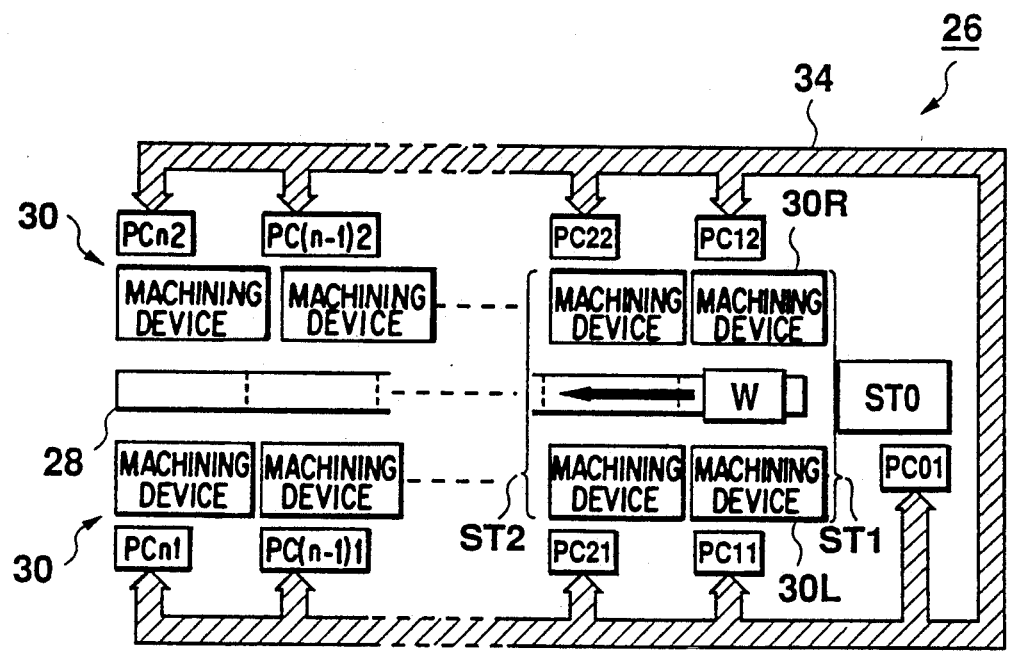
FIG. 5 is a block diagram of PC's which are dispersively arranged for controlling a transfer machine.

FIG. 4 shows the detailed structure of an embodiment of a PC 24 according to the present invention. FIG. 5 shows the entire structure of a transfer machine 26 which is controlled by a plurality of PC's 24 in parallel. This embodiment will first be explained with reference to FIG. 5.

In FIG. 5, a plurality of machining devices 30 are arranged on both sides of a transfer bar 28 for carrying a work W. This transfer machine 26 machines the work W while carrying it. A first station ST1 is composed of a pair of machining devices 30L and 30R.

Figure 6:
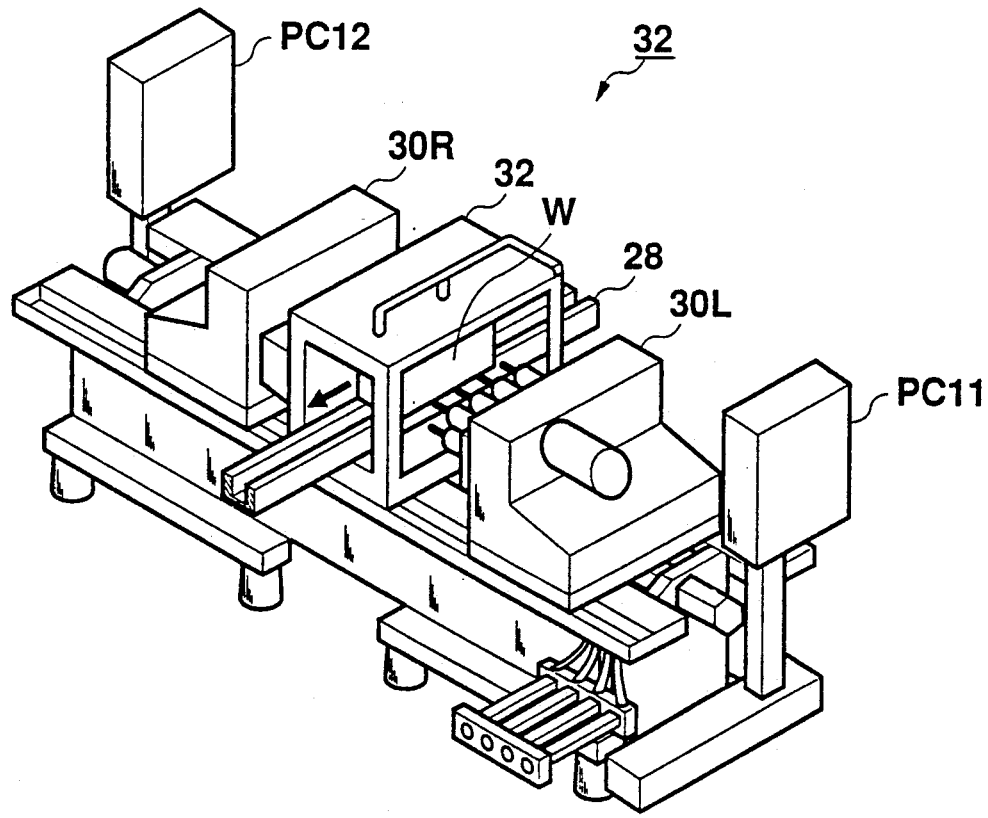
FIG. 6 is a perspective view of a machining device controlled by PC's.

FIG. 6 is a perspective view of the first station ST1. The operation of the first station ST1 will be explained. The work W carried by the transfer bar 28 is temporarily clamped by a clamping device 32. In this state, the work W is machined by the machining device 30L, 30R. The machining device 30L is controlled by a PC 11, while the machining device 30R is controlled by a PC 12. That is, the machining devices 30L and 30R are controlled by the PC 11 or 12. When machining is finished, the clamping of the work W is released and the work W is fed to the next station ST2 by the transfer bar 28.

In this way, each PC controls the machining device which is allotted thereto. However, all the PC's transmit and receive link data between each other through a link line 34 for accurately carrying and machining the work W. An example of link data is interlock information. A station ST0 in FIG. 5 is provided so as to drive the transfer bar 28 and controlled by a PC 01.

The concrete structure of a PC will now be explained with reference to FIG. 4.

A control processor 35 controls equipment (including virtual equipment) such as a switch and a coil. The pieces of equipment are connected to an I/O portion 36 through which signals are supplied and detection signals are fetched.

A program memory 38 in this embodiment has three storage regions, namely, a sequence program storage region 38a, information code storage region 38b and PC link control table storage region 38c.

In this embodiment, a sequence program contains a command and an I/O address which are set for each step. For this purpose, the sequence program storage region 38a is divided into two regions, namely, a command storage region 38a1 and an I/O address storage region 38a2. Strictly speaking, the regions 38a1 and 38a2 are mixed with each other.

In this embodiment, a command is input in the form of a logic symbol (e.g., LD). It is naturally possible to adopt a system in which a command is input in the form of a relay symbol. An I/O address is an octal or hexadecimal digit. The I/O address is a local address which is effective only in the corresponding PC, and a duplicate address exists in each PC. It is therefore difficult for the operator to judge to which equipment the address is allotted merely by seeing the I/O address.

As a countermeasure, an equipment code for each I/O address is stored in the equipment information storage region 38b. Each of the pieces of equipment which are controlled by a plurality of PC's is allotted its own individual global equipment code. The equipment code is composed of a code which enables the operator to easily understand the contents thereof.

This will be explained more concretely with reference to an equipment code "31LS1" as an example. The first letter 3 means a third station (ST3). The second letter 1 means the PC (PC 31) on the left side, and the third and fourth letters LS mean a limit switch. The last letter 1 means a limit switch No. 1. The equipment code "31LS1" thus collectively indicates a limit switch No. 1 which is controlled by the PC on the left side of the third station.

Another example "11F1D1P" will be explained. Similarly, the letters 11 mean the PC (PC 11) on the left side of the first station (ST1). The letters F1 means a fitting equipment No. 1, and the letters D2P means dummy information that the fitting equipment is at the right-hand end.

It is preferable to display an equipment code together with a program when the sequence program is displayed on a display. This facilitates the identification of the equipment to which the I/O address is allotted. Alternatively, only a command and an equipment code may be displayed in displaying the sequence program.

The PC link control table storage region 38c stores the number of another PC to which the link data is to be supplied. To state this more concretely, if "01, 12" is set at a certain step, the link data (e.g., interlock information) is supplied from the current PC to the PC 01 and the PC 12 when executing the step. The PC 01 and PC 12 which have received the link data execute the next control in accordance with the received link data. The PC link control table is automatically created, as will be described later.

An equipment code interpreter 40 will now be explained.

The equipment code interpreter 40 identifies the I/O address which corresponds to the equipment code input by the operator or received from another PC. The operator therefore can create or correct a program by using an equipment code which is easy to understand without the need for inputting the I/O address, which is a machine language. This is effective for not only improving the operability at the time of creating a program but also reducing an inputting error. The writing and reading to and from the program memory 38 are actually controlled by the control processor 35. In this embodiment, the control processor 35 and the equipment code interpreter 40 are constituted by a CPU. The system memory, data memory and the like are not shown.

As a modification of this embodiment, a table memory 40a for storing an equipment code/address conversion table may be provided separately from the program memory 38 in place of providing the equipment code storage region 38b in the program memory 38. The equipment code interpreter 40 converts an equipment code into an I/O address and an I/O address into an equipment code in accordance with the table.

The PC 24 of this embodiment has a program linkage condition memory 42. The program linkage condition memory 42 stores the conditions for linkage between the sequence programs which are stored in the respective PC's. The linkage conditions will be described later.

In the parallel control by a plurality of PC's, the transmission and reception of link data are important. In other words, in the control of the current PC, the states of the contacts of the relays which are controlled by other PC's are necessary as controlling conditions. I/O addresses are also set for such contacts.

A PC link control table is provided in order to control the PC to which such link data is supplied. In this embodiment, the creation of such a PC link control table is automated. The processing of the creation of a PC link control table will be described in the following.

FIG. 7 shows an image of a link data file 44. A control table 38c is created by using the link data file 44. The file 44 is obtained by listing up the link data which are necessary for the current PC and is circulated to the PC's other than the current PC. The file 44 is composed of PC number data 44a of the PC which supplies the file 44, PC number data 44b of the PC from which the link data are demanded, equipment code data 44c of the equipment which produces the demanded data and reception confirmation data (Yes/No) 44d written by the PC which receives this file.

By circulating the file 44 having the above-described data structure, the PC which has received this file 44 can judge what kind of link data the PC (PC 21) which supplied the file 44 demands therefrom. The PC which has received this file 44 writes the PC number 44a of the PC which supplied the file 44 in the corresponding position in its own PC link control table storage region 38c on the basis of the contents of the file 44. Simultaneously, the PC which has received the file 44 writes the reception confirmation data (Yes) 44d in the file.

Actually, the file 44 is transmitted serially as a data train 46 shown in FIG. 8. The data train 46 is composed of the PC number data 44a of the PC's which supplied the file 44 and data blocks 48 on the respective PC's. The data block 48 is composed of PC number data 44b of the PC from which the link data are demanded, equipment code data 44c of the equipment which produces the demanded data and reception confirmation data 44d. Another data arrangement is naturally possible.

Figure 9:
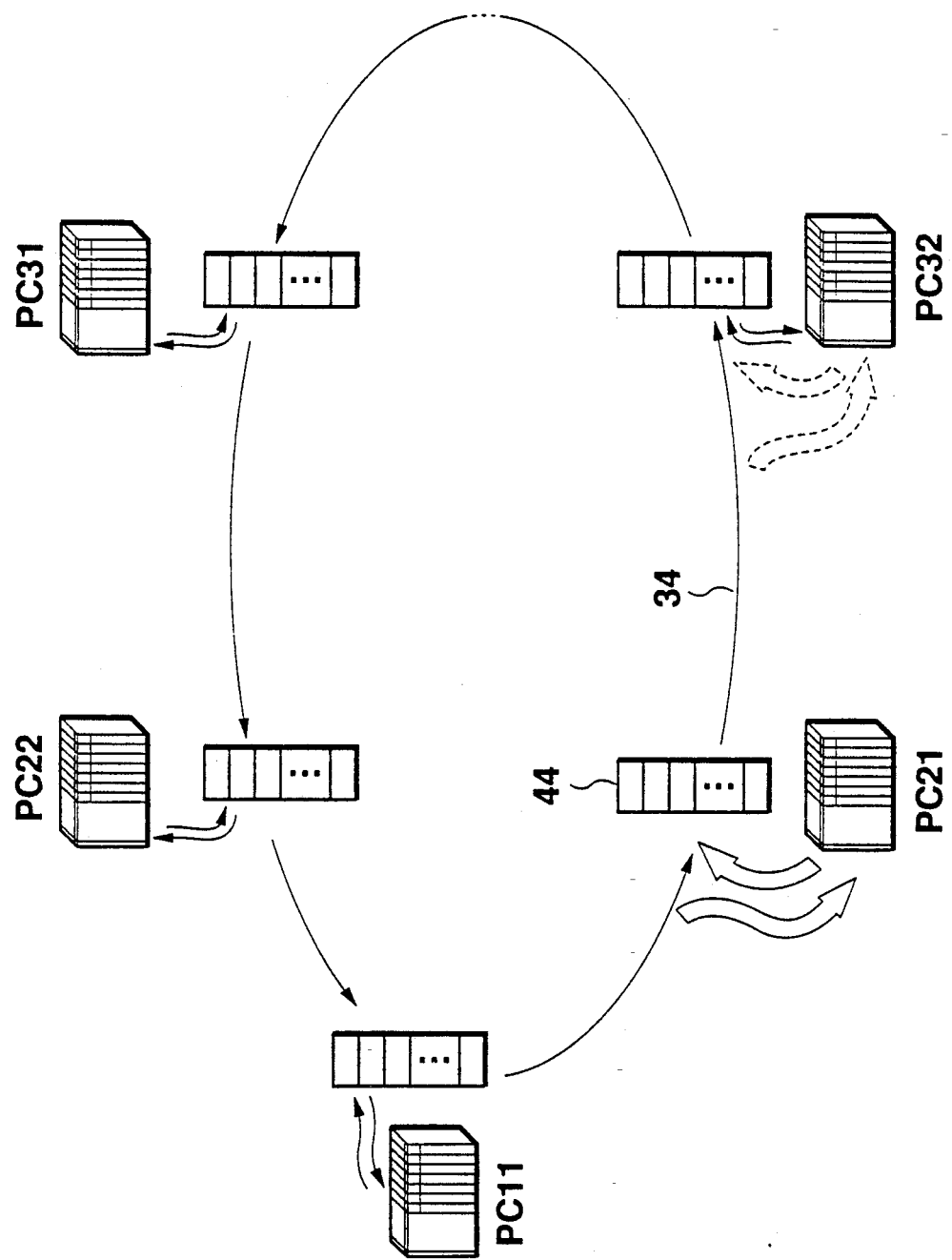
FIG. 9 is an explanatory view of a plurality of PC's which are connected to a link line and a link data file which is circulated to each PC.

FIG. 9 shows the circulation of the file 44 between a plurality of PC's which are connected to each other by the link line 34. As shown in FIG. 9, the file 44 supplied from the PC 21 is circulated to the PC 32, PC 31, . . . and finally restored to the PC 21. Thereafter, the file 44 is supplied from and restored to the PC 32. This process is repeated for each PC and the creation of the PC link control table 38c for each PC is finished. The control table creating processing will be explained in detail with reference to FIG. 10.

The following processings are executed in the state in which the sequence program of each PC has been completed. At step 101, the file 44 is first created. The equipment code storage region 38b of the program memory 38 is retrieved to pick up the pieces of equipment which are not controlled by the current PC. Since the equipment code includes a PC number code, it is easy to pick up the pieces of equipment on the basis of the PC number code. The picked-up equipment codes are listed in the file 44. In this embodiment, the linkage conditions which are stored in the program linkage condition memory 42 (see FIG. 4) are referred to at the time of creating the list of the equipment codes.

The linkage conditions will now be explained. Each PC controls in accordance with its own sequence program. Each PC therefore cannot know what program another PC has. In this embodiment, the program linkage condition memory 42 stores the conditions under which the programs of the PC's in the system are read out in linkage. In other words, the conditions for the order in which the programs held by the respective PC's are read out, as will be described later, are the linkage conditions. For example, a condition that "a certain step in a certain PC should be followed by a certain step in another PC", and a condition that "the final step in a certain PC should be followed by the first step in another PC" are determined. These are only examples and the operator can naturally determine the conditions as desired in accordance with the contents of the programs in the total system.

In this manner, each PC can easily judge how many PC's exist in the total system by confirming the contents of the program linkage condition memory 42. At the time of creating the file 44 (step 101), the lists of the equipment codes are created for all the PC's which have been judged to exist in the system. However, if a PC is not required to supply link data, "NONE" is written as the data 44c on the equipment code.

At step 102, judgment is made as to whether there is a right to supply the file 44. The order of supplying the file 44 can be set as desired. If the file 44 is supplied and restored from and to all the PC's, the order of supply does not matter. For example, the order is determined on the basis of the program linkage conditions.

If the answer is Yes at step 102, the process proceeds to step 103. At step 103, judgement is made as to whether the file 44 has been supplied to all the PC's. If the answer is Yes, this routine is finished.

On the other hand, if the answer is No at step 103, the file 44 is supplied to the link line 34 at step 104. At step 105, the file 44 circulated to the PC's other than the current PC is restored.

At step 106, the reception confirmation data 44d of the restored file 44 are read and whether the reception has been confirmed is judged with respect to each PC. If the result is No, the process proceeds to step 107 to execute bypass processing. The bypass processing will be described later. If the answer is Yes at step 106, step 108 is executed to transfer the right to supply the file 44 to the next PC.

On the other hand, if it is judged that there is no right to supply the file 44 at step 102, step 110 is executed and the PC is in the state of waiting for the reception of the file 44 which is supplied from another PC.

If the reception is confirmed, the contents of the received file are read at step 111. That is, the list 44c of the equipment codes which correspond to the PC number of the current PC are read out of the file 44.

At step 112, data are written into its own PC link control table 38c in accordance with thus-read equipment code list. At the step which corresponds to the listed equipment code, the PC number (21) which has supplied the file 44 is written in the PC link control table 38c. When this processing is finished, step 113 is executed so as to write the reception confirmation data (Yes) 44d in the file 44. Even when no equipment code which corresponds to the current PC exists, the reception confirmation data (No) 44d is written in the file 44.

At step 114, after the writing processing is completed, the file 44 is released and transferred to the next PC.

By executing the above routine in each PC, the creation of the PC link control table 38c is finally completed by each PC. The operator himself can therefore easily plan the system without the need for creating a control table in accordance with complicated contents of a program.

Figure 10:
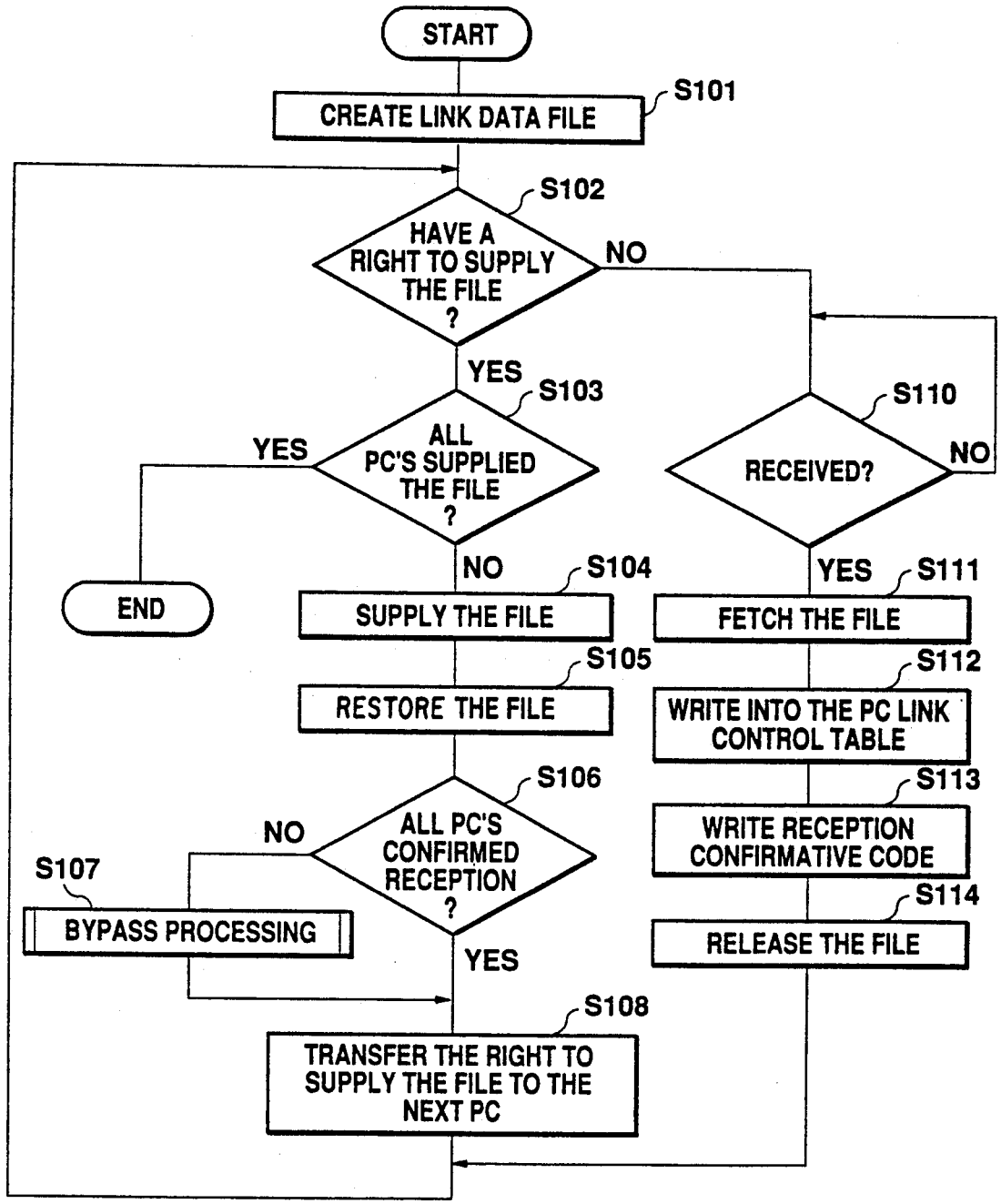
FIG. 10 is a flowchart of the operation of creating a PC link control table.

The routine shown in FIG. 10 can be executed even in the middle of system planning. For this purpose, the step of bypass processing is provided as step 107.

The bypass processing will now be explained. A program concerning the PC which has not imparted the reception confirmation data 44d is subjected to bypass processing. That is, the next proceeding is executed on the assumption that the conditions for that PC are satisfied.

The bypass processing (step 107) will be explained concretely with reference to FIGS. 11 and 12.

Figure 11:
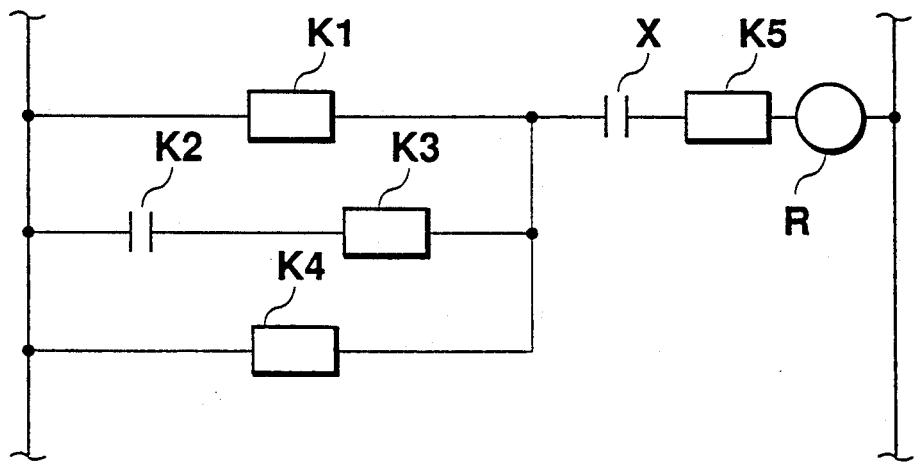
FIG. 11 shows a relay ladder explaining a program with certain control conditions set therein.
Figure 12:
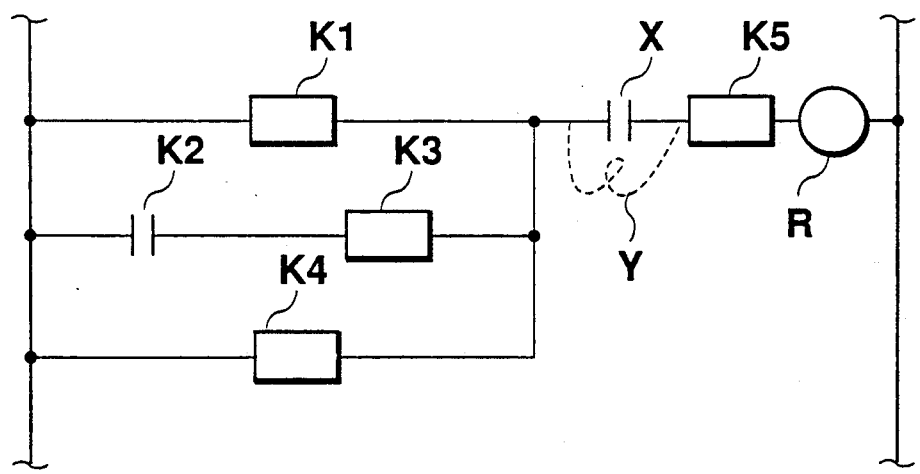
FIG. 12 is a relay ladder explaining a bypass processing.

In FIG. 11, a relay ladder of a certain program block is shown. The symbol X corresponds to an input signal from another PC. It is now assumed that the PC which is to supply the input signal X cannot supply it because the program is incomplete or for another reason.

In this circumstance, if no measure is taken, the execution of the program is stopped here. This is because the relay R is not started unless the input signal X is obtained even if all the other conditions K1, K2, K3, K4 and K5 are satisfied.

Therefore, the processing is executed on the assumption that the condition of inputting the signal X is also satisfied or this condition does not exist. This processing is the bypass processing. That is, the program is executed on the assumption that there is an OR circuit Y with respect to the condition X.

According to such bypass processing, when a certain program is incomplete or has a defect, it does not influence the execution of the programs of the other PC's.

A trial run of a part of the system is thus enabled.

In the bypass processing at step 107 shown in FIG. 10, the bypass condition Y is stored in a bypass condition memory (not shown). The control processor 35 executes the program while considering such a bypass condition during the PC control.

Another modification of this embodiment will be explained. At step 112 shown in FIG. 10, the PC number is directly written into the control table. Alternatively, the PC number may be written into an "output signal table". The output signal table is a list of output signals which are to be supplied from the current PC to other PC's. When the routine shown in FIG. 9 is finished, the PC link control table is created on the basis of the output signal table. In the routine shown in FIG. 10, it is also possible to create an "input signal table" at the time of restoring the file 44. The input signal table is a list of signals which are input to the current PC from the other PC's. In the bypass processing (at step 107), necessary input signals are written into the input signal table. Such output signal table and input signal table are created, for example, in a data memory (not shown). The control processor 35 executes the bypass processing on the basis of the input signal table.

The continuous reading of the sequence program which is executed for the maintenance or inspection of the system will now be explained.

Figure 13:
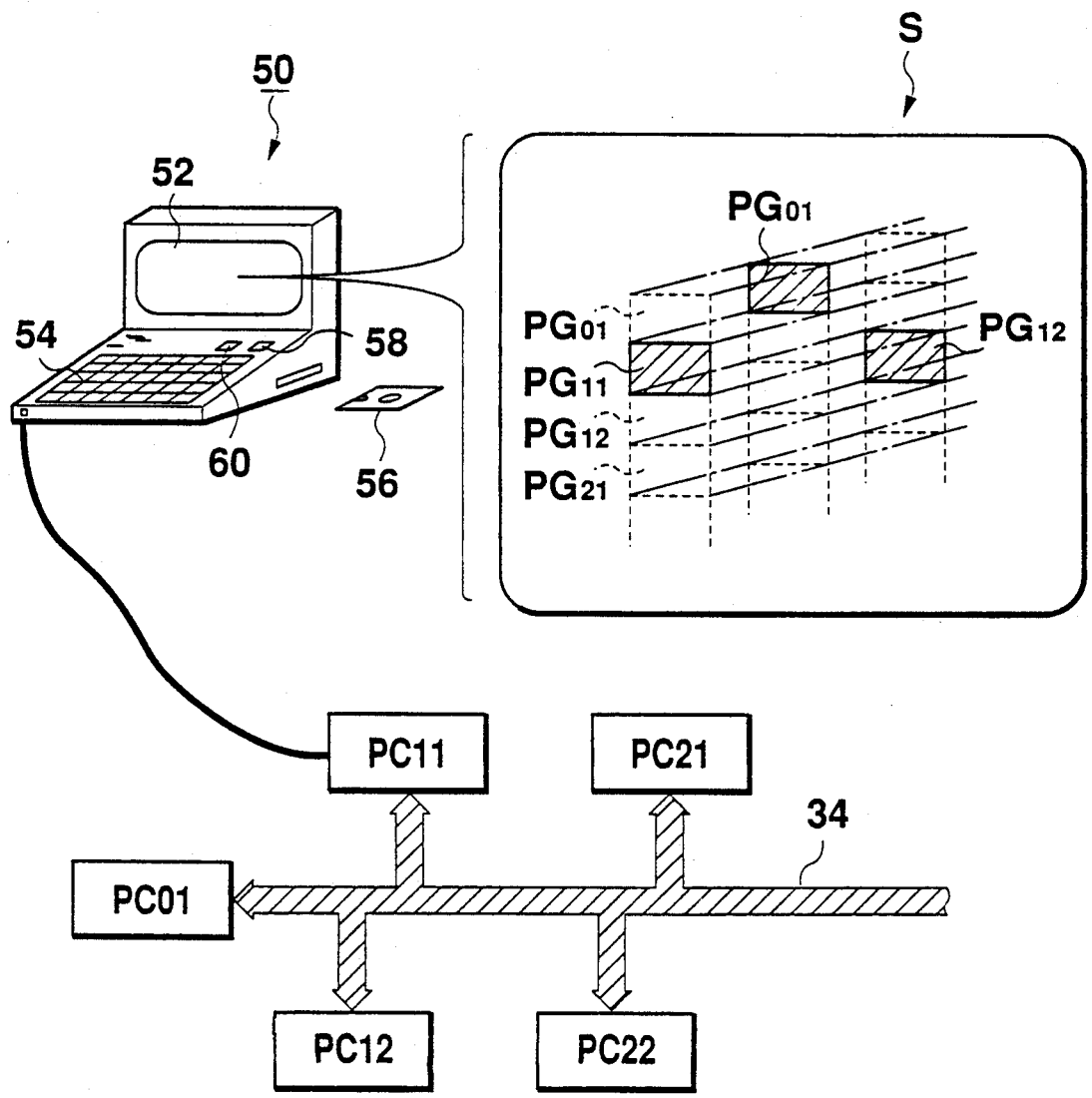
FIG. 13 is an explanatory view of a programming tool which is connected to a PC.

FIG. 13 shows a plurality of PC's which are connected to each other through the link line 34. In inspecting the programs of the respective PC's, a programming tool 50 having a display 52 is connected to one of the PC's. Conventionally, the programming tool 50 is connected to the PC having the program which needs to be read out, but in this embodiment, it is possible to continuously read out the programs which are stored in all the PC's by connecting the programming tool 50 to any given PC. The concrete processing thereof will be explained in the following.

Figure 14A:
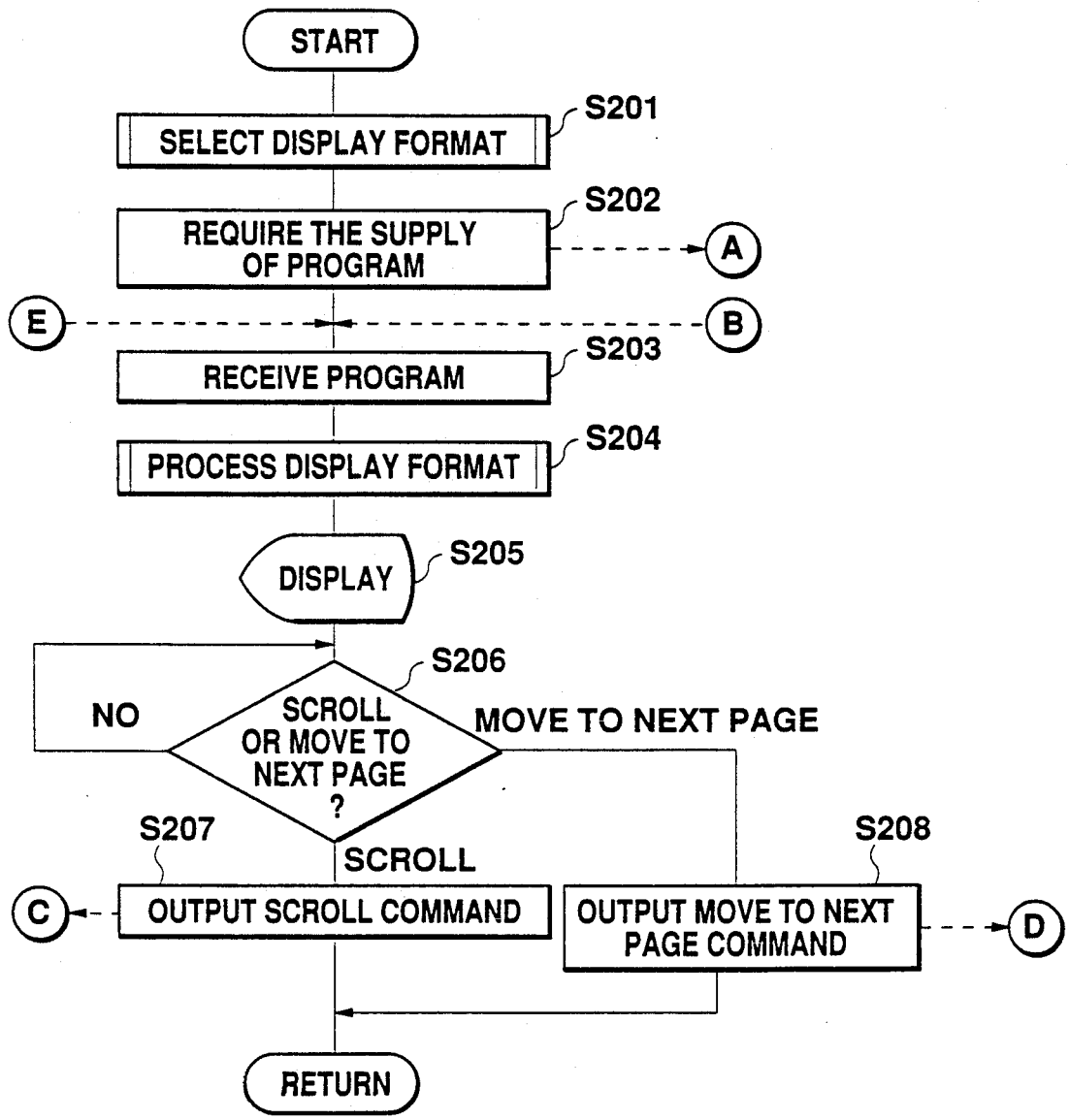
FIGS. 14A and 14B are flowcharts of a program display processing.
Figure 14B:
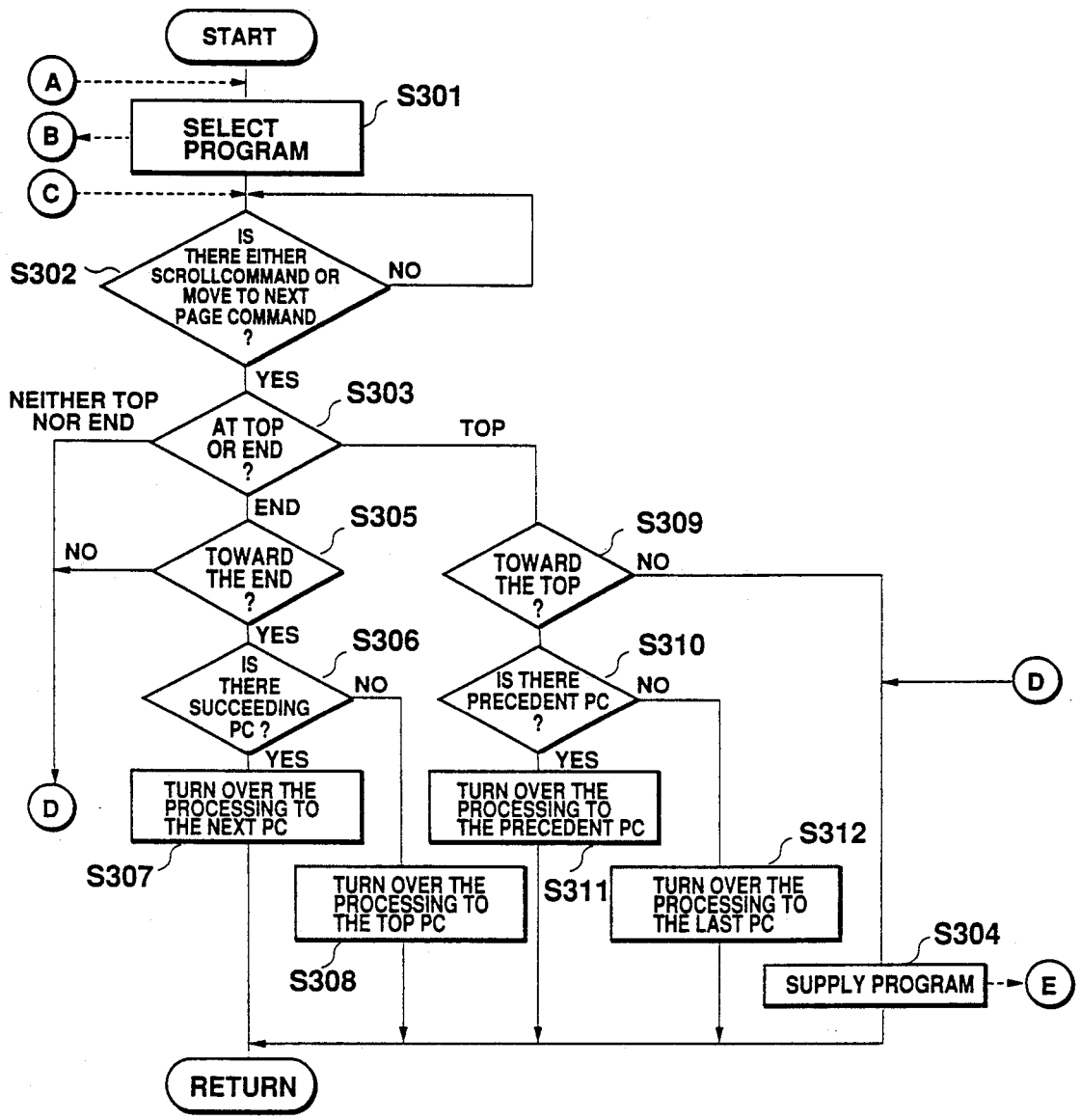

FIGS. 14A and 14B are flowcharts of the program reading processings in the PC to which the programming tool 50 is connected and in another PC, respectively.

When the operator inputs the command of reading a program into the tool 50, the following steps are executed. The case of displaying on the display 52 of the tool 50 the program stored in a PC to which the tool 50 is not connected will here be explained.

For example, when the equipment code "21F1D2P" and the command of "retrieval and reading" are input with a keyboard 54 of the tool 50, the next processings are executed.

Figure 15:
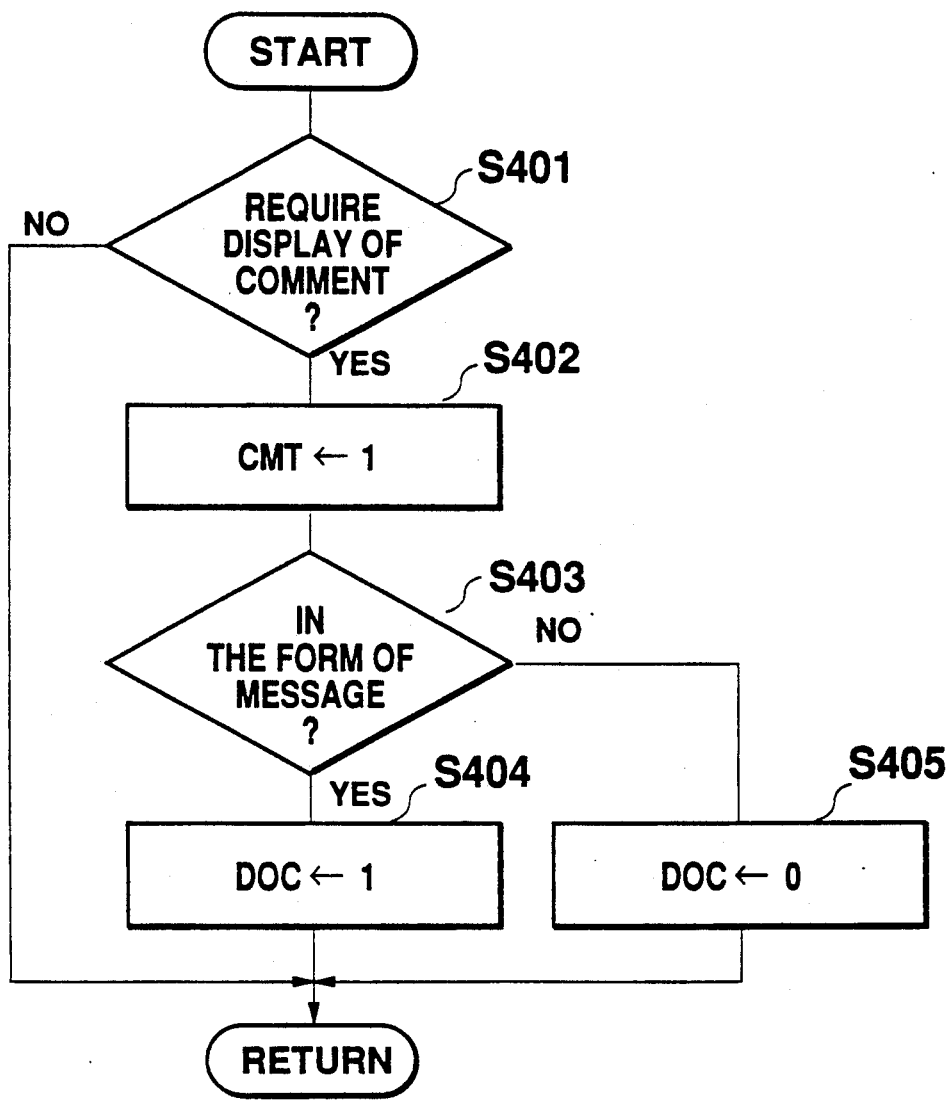
FIG. 15 is a flowchart of a display format selecting processing.

At step 201 in FIG. 14A, the display format is selected. The concrete processing is shown in FIG. 15. In FIG. 15, the prompt "Program will be displayed with a comment added?" is first displayed on the display 52 of the tool 50 at step 401. If the operator selects No, this routine is finished. On the other hand, if Yes is selected, "1" is substituted into a flag CMT.

At step 403, it is determined whether a comment in the form of a message is required or not (namely, a comment in the form of an equipment code is required). The comment in the form of a message is, for example, a comment explaining the details such as "Forward end of the transfer" and "Limit switch ON". If Yes is selected at step 403, "1" is substituted into a flag DOC at step 404, while if No is selected, "0" is substituted into the flag DOC at step 405. This routine is thereby finished.

In FIG. 14A, after the step 201 is finished, step 202 is executed. At step 202, the PC number code "21" of the PC at the top is read out of the input equipment code "21F1D2P". In this case, since the PC (PC 11) to which the tool 50 is connected can judge that this PC number is not its own code, the PC 11 requires the PC 21 to supply the program block (consisting of 1 to several steps) which corresponds to the input equipment code by transferring the input equipment code "21F1D2P" and the command "retrieval and reading" to the PC 21.

In FIG. 14B, another PC which has received the requirement executes step 301. At step 301, the contents of the input equipment code are judged by the equipment code interpreter 40. If the input equipment code is judged to indicate the equipment which the current PC controls by the equipment code interpreter 40, the current PC supplies the data on the program block concerning the control of the equipment to the PC 11 which has required the data. Together with the program data, the data on the equipment code which is stored in the equipment code storage region 38bis also supplied.

In FIG. 14A, the supplied data on the program block and data on the equipment code supplied from the PC are received and stored in a data memory (not shown) at step 203.

Figure 16:
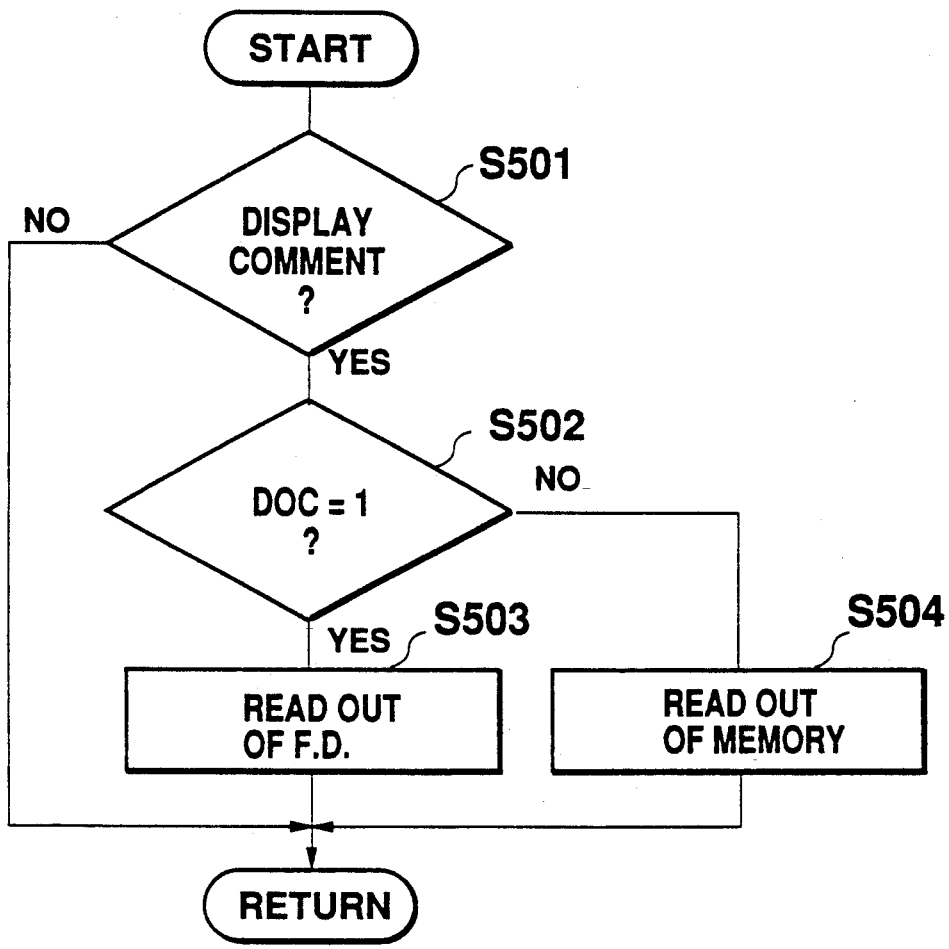
FIG. 16 is a flowchart of a processing based on a designated display format.

At step 204, the display format is processed. FIG. 16 shows the concrete processing. At step 501 in FIG. 16, judgment is made as to whether the comment is displayed or not in accordance with the flag CMT. If the comment is not displayed (CMT=0'), this routine is finished.

On the other hand, if the comment is displayed (CMT=1), whether the flag DOC is "1" or not is judged at step 502. If DOC is "1", step 503 is executed, and the comment in the form of a message which corresponds to the input equipment code is read out of a floppy disk 56 of the tool 50. The data on the program block stored in the data memory of the PC 11 is also supplied to the tool 50.

If the DOC is judged not to be "1" at step 502, the data on the program block and the data on the equipment code stored in the data memory are supplied to the tool 50 at step 504.

In FIG. 14A, the program is displayed on the display 52 at step 205. In this case, the comment in the form of a sentence or an equipment code is displayed together with the program.

The operator can therefore judge easily which equipment is allotted to the I/O address from the displayed I/O address and comment.

The operations of scrolling the displayed program and moving to the next page will be explained.

At step 206, judgement is made as to whether or not a scroll key 60 or a move to next page key 58 has been operated. If it is judged that the scroll key 60 has been pressed, the process goes to step 207 and a scroll command is issued to the PC (PC 21) which holds the displayed program. On the other hand, if it is judged that the move to next page key 58 has been pressed, the process goes to step 208 and a command of moving to the next page is issued to the PC 21 in the same way as at step 207.

In FIG. 14B, the PC which has received either of these commands judges as to the presence of the command at step 302, and when the command is confirmed, step 303 is executed.

At step 303, judgement is made as to whether the program block supplied at step 301 (or step 304) is situated at the top or end of the whole program. If it is judged that the program block is not situated either at the top or at the end, step 304 is executed and the next program block is supplied at step 304 in the same way as step 301.

On the other hand, if the program block is judged to be situated at the end of the whole program at step 303, judgement is made as to whether or not the program block is to be scrolled or moved toward the end of the program block at step 305. If the answer is No, since the next program block can be supplied to the PC 11, step 304 is executed. On the other hand, if the answer is Yes at step 305, step 306 is executed.

At step 306, judgement is made as to whether or not there is a PC succeeding the current PC in the reading of the programs in accordance with the linkage conditions stored in the program linkage condition memory 42.

The program linkage condition memory 42 stores the linkage conditions concerning the reading of the programs stored in all the PC's.

In order to continuously display the programs on the display 52 of the tool 50, whether or not there is a succeeding program is judged at step 306.

If the answer is Yes at step 306, the processing is turned over to the next PC at step 307.

On the other hand, if the answer is No at step 306, the processing is turned over to the PC at the top in the linkage of the programs at step 307. That is, since that the answer is No at step 306 means that the current PC is the last PC in the program linkage conditions, the processing of supplying the program is turned over to the PC at the top.

Since the processings at steps 309 to 312 are almost the same as those at steps 305 to 308 except the direction of scrolling or moving to the next page is different, explanation thereof will be omitted.

In this way, the operator can continuously see the programs which are stored in the respective PC's by the operation of the scroll key 60 or the move to next page key 58 on the display 52. On the display 52, when the display of one program is finished, another program is displayed, as shown in FIG. 13 as an image S. It is therefore possible to display all the programs as a series of programs. When the display of the last program in the program linking conditions is finished, the program at the top can be displayed subsequently. The operator thus feels as if all the programs were connected to each other in the form of a ring.

Therefore, the conventional operation of connecting the tool 50 to each PC for inspecting the respective contents is obviated and it is possible to get the contents of the programs in the whole system by connecting the tool 50 to any given PC.

The program linkage condition memory 42 may not necessarily be provided in each PC. For example, the program linkage condition memory 42 may be provided in the host PC (PC 01) and the other PC's may refer to the program linkage condition memory 42 of the host PC. Alternatively, each PC may be provided with a memory 42 which stores only the conditions concerning its own PC and the linkage with the precedent PC and the following PC.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A programmable control system having a plurality of programmable controllers which are connected to each other through a link bus for controlling pieces of equipment in parallel while transmitting and receiving link data therebetween under the condition that any one of said plurality of programmable controllers has received link data from another one of said plurality of programmable controllers, wherein each of said programmable controllers comprises:

program storing means for storing a sequence program;

link control table storing means for storing a link table in which numbers are stored which uniquely identify each of the plurality of programmable controllers to which said link data is to be supplied at a specific step when executing said sequence program;

link data file creating means for creating a link data file in which a code is listed for each of the plurality of programmable controllers, the code indicating said link data required to be supplied from said another one of the plurality of programmable controllers at a specific step when executing said sequence program;

link data file supplying means for supplying the created link data file to said link bus; and link control table writing means for receiving said link data file which is supplied from said another one of the plurality of programmable controllers and writing into said link control table numbers uniquely identifying each of the programmable controllers to which said link data is to be supplied in accordance with the contents of the received link data file.

2. A programmable control system according to claim 1, wherein:

said program storing means includes a region for storing a local I/O address which is allotted to each piece of equipment and a region for storing a command which is designated together with said I/O address;

each of said programmable controllers further comprising:

equipment code storing means for storing an equipment code which is a global code indicating a piece of equipment allotted to said I/O address; and equipment code interpreting means for identifying the I/O address which corresponds to an input equipment code; and said link data file having said equipment code written therein as a code indicating said link data which is required to be supplied.

3. A programmable control system according to claim 2, wherein said equipment code is composed of at least a number code for said programmable controller, a type code for said piece of equipment and a number code for said piece of equipment.

* * * * *